Patented July 10, 1928.

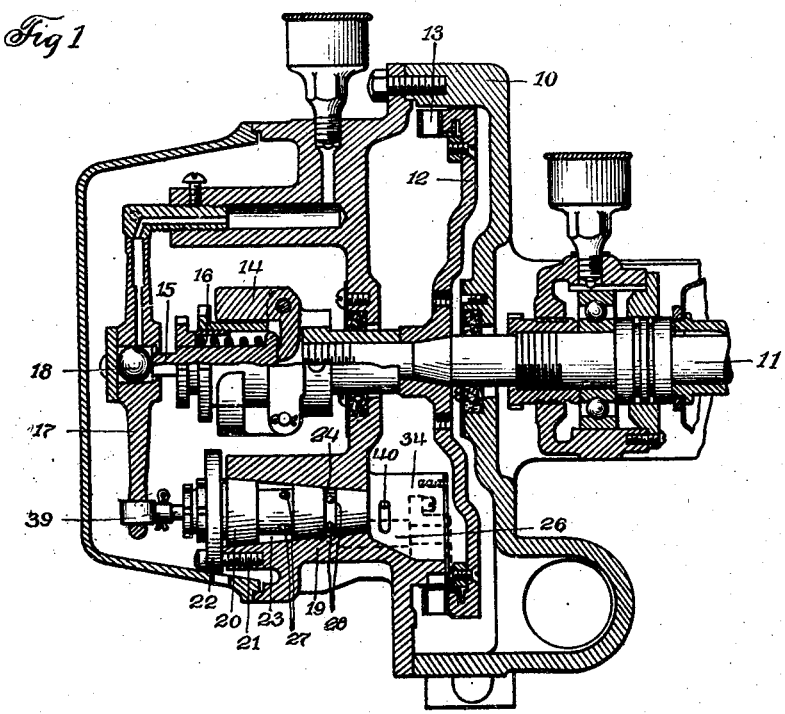

1,676,903

UNITED STATES PATENT OFFICE.

LEE B. JONES AND EDWARD H. WERZNER, OF EVANSVILLE, INDIANA, ASSIGNORS TO SUNBEAM ELECTRIC MANUFACTURING COMPANY, OF EVANSVILLE, INDIANA, A CORPORATION OF INDIANA.

VALVE.

Application filed August 5, 1920. Serial No. 401,538.

Our invention relates to valves and it has particular relation, although it is not limited, to devices of the character designated which are employed in fluid turbines.

In fluid-driven machines, and particularly in machines attaining high speeds, it is very desirable that means be provided whereby, upon the failure of the normal governing means, the supply of motive fluid will be cut off. In the past many serious accidents have resulted from the provision of inadequate safety device in this connection.

Because of the high speed attained in turbines, the tendency for a governing apparatus to become disarranged and fail to function properly is more frequent than otherwise, and it is essential therefore that means be provided which are entirely independent of the normal governing device to prevent an excessive supply of fluid to the energy wheel of the turbine.

One object of our invention is to provide means whereby the above protection may be obtained with a minimum amount of additional apparatus, no complicated safety mechanism being employed.

In attaining this object we provide means whereby the motive fluid itself functions to close the supply when the amount of fluid flowing toward the energy wheel is in excess of that required for safe operation. In other words the fluid itself acts, in part, as a safety agent upon the failure of the governor.

This particular action is obtained by allowing the fluid to act in opposite directions upon surfaces of unequal areas whereby the member carrying said surfaces is over-balanced to a slight degree and, upon the breaking, or other failure, of the apparatus primarily governing the movement of said surfaces, the unbalance occasioned by the difference in areas causes the closing of the valve and the cutting-off of the fluid supply.

Another object of our invention is to so embody a valve and its associated valve cage in a turbine casing that the latter seats snugly over its entire length in said casing and may be quite simply and expeditiously secured therein. To this end I form a valve cage seat somewhat conical and so arrange the fluid inlet and outlet thereto that a valve cage conforming in conical shape to said seat and having annular channels formed thereon may be so positioned within said seat that a fluid channel is provided for the supply of said fluid to an energy wheel.

Further objects of our invention, as well as a fuller explanation of the above objects, will be apparent from the hereinafter description of our invention, together with the accompanying drawings, in which:

Fig. 1 is an elevational, sectional view of a turbine casing, illustrating the manner in which our improved valve construction is embodied therein; and Fig. 2 is an elevational sectional view of the valve cage and associated parts, illustrating in detail the operation of said valve.

A turbine casing 10 has a shaft 11 passing therethrough on which is mounted an energy wheel 12 carrying fluid receiving buckets 13. On the shaft 11 are mounted governing arms 14 which, upon rotation of said shaft, function to force a member 15 outwardly against the action of the spring 16. A lever 17 is pivotally mounted within the casing and has socketed therein a ball 18 against which the end of the member 15 contacts, whereby the lever is swung upon an axis perpendicular to the plane of the paper.

Formed within the turbine casing, is a valve-cage seat 19 which is of substantially frusto-conical form having its larger end adjacent the valve control lever 17 and its smaller end adjacent the energy wheel 12. A valve cage 20 conforms in shape to the seat 19 and may be very accurately fitted therein and thereafter secured in place by bolts 21 passing through a flange portion 22 formed integrally with the valve cage 20. In the outer surface of the valve cage are formed annular channels 23 and 24 and interiorly of the cage is formed a central chamber 25, which is cylindrical in form, being open at one end and closed at the other.

While we have omitted (for sake of simplicity) a showing of the fluid inlet and outlet, it will be understood that the steam supply channel terminates in the seat portion 19 adjacent the annular channel 23 and, as indicated in dotted lines, a fluid outlet 26 which terminates at one end adjacent the channel portion 24 and at its other end is adapted to supply the buckets 13 of the energy wheel 12. Inlet ports 27 connect the annular space 23 with the central chamber 25 of the valve cage and outlet ports 28 connect the chamber 25 with the annular channel 24.

A valve stem 29 is adapted to reciprocate within the valve cage and has formed thereupon pistons 30 and 31. It will be observed that the piston 31 is slightly larger than the piston 30 and that portion of the chamber 25 in which it reciprocates is of conformable diametral dimension, said piston 31 being limited in its movement to the left by a shoulder 32 which is established because of the difference in the diameters of the two portions of the chamber 25. An annular space 33 is comprised between the end of the chamber 25 and the piston 30.

The pressure in said space 33 and that in the exhaust chamber 34 of the turbine are equalized by the passage of fluid through a central passage 35 formed in the stem 29, this passage terminating at the inner surface of the piston 30 in a plurality of openings 36.

A packing gland 37 insures the fluid-tight passage of the stem 29 into the cage and is secured in place by a member 38. The end of the stem 29 is provided with screw-threads whereby a yoke or eye 39, in which the lower end of the lever 17 is positioned, may be secured thereto. By providing the latter connection the lever 17 reciprocates the stem 29, as the former is pivotally moved by contact of the rod 15 and the ball 18.

This eye or yoke connection is a very desirable feature of the valve mechanism. In the commercial manufacture of the entire governing mechanism, it is almost impossible to make the governor and governor stem run absolutely true. They are out of round more or less, due to the necessary clearness between parts that fit together, and this causes the lever 17 to vibrate more or less. It is also important that there be no side pressure on the valve stem 29 where it passes through packing 37. With the lever loosely mounted in the yoke, any vibration existing in the lever is not transmitted to the valve, nor is there a tendency to bind the valve stem in any direction.

Positioned within the casing and adapted to obstruct the movement of the piston 31 to the right is a pin 40 the purpose of which will be hereinafter described in connection with the operation of my improved valve.

During the normal operation of the turbine the governor moves the stem 29 through the lever 17 so that the pistons 30 and 31 control the opening of the ports 27 and 28 respectively. It will be noted that the inlet and outlet ports are positioned between the two pistons whereby hereinafter-described beneficial results are obtained.

The provision of the passage 35 through the stem 29 allows the exhaust steam pressure to act upon the outside of both of the pistons whereby very desirable results are obtained since the pressure of the exhaust steam is quite low, practically atmospherical. In case the governor becomes disarranged and therefore fails to properly control the amount of steam fed to the energy wheel, serious consequences may ensue because of the excessive speed developed by the turbine. However, even though the governing mechanism fails entirely, the unbalancing of the valve because of the unequal areas of the inside surfaces of the pistons 30 and 31 will cause the valve stem 29 to move instantly to the right until the piston 31 is stopped by the pin 40. In this position of the stem, the piston 30 will close the inlet port 27 thus effectively cutting off the supply of steam to the turbine and positively preventing any injury to the machine. Under normal conditions, of course, the steam supply to the energy wheel is governed by the piston 31 cooperating with the outlet port 28.

From the above description, it will be apparent to those skilled in the art that we have provided a positive safety device whereby, upon the governor failure, the steam pressure itself acts to close the valve and to cut off the steam supply. By so associating the safety means we have entirely eliminated the need for springs, or other complicated safety mechanism, which are always a source of trouble. Moreover, because of the fact that the steam itself acts upon the larger area piston the safety action is entirely positive.

Moreover, the constant urging of the valve to the right maintains the ball 18 in contact with the stem 15 whereby no lost motion or slack occurs in the governing mechanism. Finally, because of the action of the overbalanced valve no springs are necessary to move the valve upon a reduction of speed, the tendency of the valve to move to the right being present at all times when steam is admitted between the pistons, and it being noted that, when the turbine is started by such admission of steam, there is even then an urging of the valve to the right whereby the inlet is opened.

While we have shown but one embodiment of our invention we believe that the provision of means whereby the excess fluid pressure is itself operative to provide the required safety measures is entirely novel and we desire, therefore, that our invention be interpreted broadly and that it be limited only by the showing of the prior art and by the scope of the appended claims.

Having thus described our invention, what we claim as new and desire to secure by Letters Patent is:

1. In a turbine, a fluid supply valve, means for normally moving said valve in accordance with the speed of said turbine, and means which is dependent entirely on the fluid pressure in said turbine for closing said valve upon the failure of said first means.

2. In a turbine, a fluid supply valve, governing means for normally moving said valve in one direction as the speed increases to close the same, and means dependent solely on the fluid pressure for closing said valve in the opposite direction when said governor means fails.

3. In a turbine, a valve having a reciprocable stem, and means including pistons on said stem whereby said valve constantly tends to move in one direction, said pistons having external surfaces subjected to equal unit pressures at all times.

4. In a turbine, a valve having a reciprocable stem, governing mechanism associated with said stem to control its movement in either direction as dictated by the speed of said turbine, and means including pistons on said stem whereby said valve constantly tends to move in one direction, said pistons having external surfaces subjected to equal unit pressures at all times.

5. In a turbine, a valve having a reciprocable stem, and means including pistons on said stem whereby said valve constantly tends to move in one direction at all times, said last means operating to close said valve when said governing mechanism fails, said pistons having external surfaces subjected to equal unit pressures at all times.

6. In a turbine, a valve for controlling the fluid supply to said turbine, a governor co-operating with said valve, and means operated by said fluid supply to close said valve upon the failure of said governor.

7. In a turbine, a valve comprising an inlet and an outlet for controlling the fluid supply to said turbine, a governor cooperating with said valve, and means whereby the fluid flowing through said inlet, automatically closes the same upon the failure of said governor.

8. In a turbine, a source of fluid supply, a valve for controlling the fluid supply to said turbine, a governor cooperating with said valve, and means comprising a portion of said valve which is acted upon by said fluid for automatically cutting off the fluid supply to said turbine upon the failure of said governor.

9. In a turbine, a source of fluid supply, a valve for controlling the fluid supply to said turbine, a governor cooperating with said valve, said valve having an unbalanced movable member so disposed therein with respect to the fluid supply to said turbine that said supply is automatically cut off upon the failure of said governor.

10. In a turbine, a source of fluid supply, a valve for controlling the fluid supply to said turbine, a governor cooperating with said valve, said valve having an unbalanced movable member so disposed therein with respect to the fluid supply to said turbine that the excess fluid supply, upon the failure of said governor, acts to close said valve irrespective of the pressure of said fluid, so long as said pressure exceeds the exhaust pressure of the turbine.

11. In a turbine, a valve comprising a valve cage having a central chamber and inlet and outlet ports connecting said central chamber to a fluid supply and to an energy wheel, respectively, a stem reciprocable in said chamber, pistons governing mechanism mechanically connected to said stem associated with said stem and adapted to open and close said ports, means associated with said stem for substantially equalizing the pressure on the outside surface of said pistons, and means comprising the inner surfaces of said pistons for unbalancing said pistons.

12. In a turbine, a valve comprising a valve cage having a central chamber and inlet and outlet ports connecting said central chamber to a fluid supply and to an energy wheel, respectively, a stem reciprocable in said chamber, pistons governing mechanism mechanically connected to said stem associated with said stem, and adapted to open and close said ports, the working surfaces of said pistons being of different areas whereby said valve is unbalanced and means associated with said stem for substantially equalizing the pressure on the outside surface of said pistons.

13. In a turbine, a valve comprising a valve cage having a central chamber and inlet and outlet ports connecting said chamber to a fluid supply and to an energy wheel, respectively, a stem reciprocable in said chamber, pistons governing mechanism mechanically connected to said stem on said stem adapted to govern the opening of said ports, and means for substantially equalizing the pressure on the outside surface of said pistons, the inside surfaces of the latter being of different area whereby the valve tends to move in a definite direction.

14. In a turbine, a valve comprising a valve cage having a central chamber, a stem reciprocable in said chamber, pistons having different diameters associated with said stem, and means forming ports opening into said chamber between said pistons, said ports functioning to deliver a motive fluid to said turbine, and said pistons being so disposed that their external surfaces are subjected to equal unit pressures at all times.

15. In a turbine, a valve comprising a valve cage having a central chamber and inlet and outlet ports connecting said chamber to a fluid supply and to an energy wheel, respectively, a stem reciprocable in said chamber, pistons on said stem whereby an annular chamber is formed by said cage, said pistons and said stem which, in certain positions of said stem, connects said inlet and outlet ports, one of said pistons being so disposed on said stem that an annular pressure chamber is formed between the outside surface thereof and said cage, and a passage in said stem extending from said surface to the outside surface of the other piston whereby the pressures on said surfaces are substantially equal, the inside surface of said pistons being of different area whereby the valve tends to move in a definite direction.

16. In a turbine, a valve comprising a valve cage having a central chamber and inlet and outlet ports connecting said chamber to a fluid supply and to an energy wheel, respectively, a stem reciprocable in said chamber, pistons on said stem whereby an annular chamber is formed by said cage, said pistons, and said stem which, in certain positions of said stem, connects said inlet and outlet ports, one of said pistons being so disposed on said stem that an annular pressure chamber is formed between the outside surface thereof and said cage, and a passage in said stem having a plurality of openings disposed around said stem in the outside surface of said last-named piston, said passage terminating at its other end in the outside surface of the other piston.

17. In a turbine, governing mechanism, a valve comprising a valve cage having a central chamber and inlet and outlet ports connecting said chamber to a fluid supply and to an energy wheel, respectively, a stem reciprocable in said chamber, pistons mounted on said stem to govern the opening of said ports, means comprising one of said pistons whereby said valve is closed upon the failure of said governing mechanism by the movement of said stem in a definite direction, and means for limiting the movement of said stem after the closure of said valve.

18. In a turbine, governing mechanism, a valve comprising a valve cage having a central chamber and inlet and outlet ports connecting said chamber to a fluid supply and to an energy wheel, respectively, a stem reciprocable in said chamber, pistons mounted on said stem to govern the opening of said ports, means comprising one of said pistons whereby said valve is closed upon the failure of said governing mechanism by the movement of said stem in a definite direction, and a pin on the turbine casing and projecting into the path of said pistons for limiting the movement of said stem after the closure of said valve.

19. In a turbine, means forming a valve cage seat, a valve cage seated therein, means forming a fluid inlet and means forming a fluid outlet terminating in said seat, annular depressed portions formed in said cage adjacent the termination of said fluid inlet and said fluid outlet, and means forming a central interior chamber in said cage communicating with said annular portions.

20. In a turbine, means forming a frusto-conical seat, a valve cage conforming to said seat, means forming a fluid inlet and means forming a fluid outlet terminating in said seat, annular depressed portions formed on the surface of said cage, means forming a central chamber interiorly of said cage, and means forming ports whereby said annular portions and said central chamber are connected.

In witness whereof, we have hereunto subscribed our names.

LEE B. JONES.
EDWARD H. WERZNER.

CERTIFICATE OF CORRECTION.

Patent No. 1,676,903. Granted July 10, 1928, to

LEE B. JONES ET AL.

It is hereby certified that error appears in the printed specification of the above numbered patent requiring correction as follows: Page 2, line 40, for the word "clearness" read "clearances"; page 3, lines 78, 92, and 106, claims 11, 12, and 13, strike out the word "pistons" and insert the same to follow after the word "stem" in lines 79, 93, and 107, claims 11, 12, and 13, respectively; and that the said Letters Patent should be read with these corrections therein that the same may conform to the record of the case in the Patent Office.

Signed and sealed this 28th day of August, A. D. 1928.

(Seal)

M. J. Moore,
Acting Commissioner of Patents.